(12) United States Patent
Asher et al.

(10) Patent No.: US 7,873,584 B2
(45) Date of Patent: Jan. 18, 2011

(54) METHOD AND SYSTEM FOR CLASSIFYING USERS OF A COMPUTER NETWORK

(76) Inventors: Oren Asher, 51 Bronte Road, Richmond Hill, ON (CA) L3T 7J4; Antoaneta Popova, 1 Andrey Liapchev Street, Floor 7, Darvenitsa, Sofia (BG) 1797

( * ) Notice: Subject to any disclaimer, the term of this patent is extended or adjusted under 35 U.S.C. 154(b) by 995 days.

(21) Appl. No.: 11/640,941

(22) Filed: Dec. 19, 2006

(65) Prior Publication Data

US 2007/0150426 A1 Jun. 28, 2007

Related U.S. Application Data

(60) Provisional application No. 60/752,482, filed on Dec. 22, 2005.

(51) Int. Cl.
*G06E 1/00* (2006.01)
*G06E 3/00* (2006.01)
*G06F 15/18* (2006.01)
*G06G 7/00* (2006.01)

(52) U.S. Cl. ..................................... 706/20
(58) Field of Classification Search .................. 706/20
See application file for complete search history.

(56) References Cited

U.S. PATENT DOCUMENTS

| | | | | |
|---|---|---|---|---|
| 5,729,662 | A | * | 3/1998 | Rozmus ..................... 706/20 |
| 5,812,126 | A | * | 9/1998 | Richardson et al. ......... 715/741 |
| 6,029,195 | A | | 2/2000 | Herz |
| 6,047,277 | A | * | 4/2000 | Parry et al. ................ 706/20 |
| 6,735,568 | B1 | | 5/2004 | Buckwalter et al. |
| 6,898,631 | B1 | | 5/2005 | Kraft et al. |
| 7,366,705 | B2 | * | 4/2008 | Zeng et al. .................. 706/20 |
| 2002/0138271 | A1 | * | 9/2002 | Shaw ........................ 704/270 |
| 2006/0143175 | A1 | * | 6/2006 | Ukrainczyk et al. ........... 707/6 |
| 2007/0013515 | A1 | * | 1/2007 | Johnson et al. .......... 340/568.1 |

OTHER PUBLICATIONS

Taner, Turhan, "Kohonen's Self Organizing Networks with Concience", Rock Solid Images, Nov. 1997.
Kunchev et al., "Handwritten Symbol recognition Algorithm Based on a Modified Self-Organizing Neural Network", 1996 International Conference . . . on Telecommunications, Apr. 1996, Istanbul, Turkey.
Orwig & Chen, "A Graphical, Self-Organizing Approach to Classifying Electronic Meeting Output", Journal of the American Society for . . . Information Science, 48(2):157-170, 1997.

* cited by examiner

*Primary Examiner*—Michael B. Holmes
*Assistant Examiner*—Vincent M Gonzales
(74) *Attorney, Agent, or Firm*—Alex Porat

(57) ABSTRACT

A method of classifying an anonymous user communicating over a computer network, such as by age, gender, or personal interests, based on the content generated or otherwise communicated by the user. The method includes: (a) providing sets of reference attributes, wherein each set of reference attributes is associated with one of a number of personal profile classes; (b) analyzing the user content in order to extract a set of attributes corresponding to such content; (c) comparing the set of extracted attributes against the plural sets of reference attributes in order to find a close match; and (d) associating the user with the personal profile class of the matched set of reference attributes.

12 Claims, 8 Drawing Sheets

| 0 | -1 | -1 | -1 | -1 | -1 | -1 |
|---|----|----|----|----|----|----|
| w | a  | q  | s  | t  | e  | r  |
| w | a  | t  | e  | r  |    |    |
| 0 | -1 | -1 | -1 | -1 |    |    |

40A

| 0 | 1 | -1 | -1 | -1 | -1 | -1 |
|---|---|----|----|----|----|----|
| w | a | q  | s  | t  | e  | r  |
| w | a | t  | e  | r  |    |    |
| 0 | 1 | -1 | -1 | -1 |    |    |

40B

| 0 | 1 | -1 | -1 | 2 | -1 | -1 |
|---|---|----|----|---|----|----|
| w | a | q  | s  | t | e  | r  |
| w | a | t  | e  | r |    |    |
| 0 | 1 | 4  | -1 | -1|    |    |

40C

| 0 | 1 | -1 | -1 | 2 | 3 | -1 |
|---|---|----|----|---|---|----|
| w | a | q  | s  | t | e | r  |
| w | a | t  | e  | r |   |    |
| 0 | 1 | 4  | 5  | -1|   |    |

40D

| 0 | 1 | -1 | -1 | 2 | 3 | 4 |
|---|---|----|----|---|---|---|
| w | a | q  | s  | t | e | r |
| w | a | t  | e  | r |   |   |
| 0 | 1 | 4  | 5  | 6 |   |   |

METHOD AND SYSTEM FOR CLASSIFYING USERS OF A COMPUTER NETWORK

CROSS REFERENCE TO RELATED APPLICATIONS

This application claims the benefit of U.S. Provisional Patent Application No. 60/752,482 filed Dec. 22, 2005, entitled "Method and System of Personal Profiles Classification", the contents of which are incorporated by reference herein.

FIELD OF INVENTION

The invention relates generally to the field of network content monitoring, and more particularly to a method and system for classifying otherwise anonymous users of a computer network based on the data generated by such users, particularly textual data.

BACKGROUND OF INVENTION

The Internet is an increasingly important place to work, play and learn for both adults and children. At the same time, Internet users, particularly children, face a variety of risks including the misuse of personal or sensitive information. For example, chat rooms and instant messaging on the Internet are very popular activities for young people, especially teenagers, but it is also the area where they are most likely to get into trouble. In a chat area, it is easy for a child to forget that he or she does not in fact know the true identity of the person on the other side of the conversation.

There are many web sites providing chat room safety tips or advising of ways to avoid problems in chat rooms (see, e.g., http://www.siec.k12.in.us/~west/wdu/chat.htm or http://kids.getnetwise.org/safetyguide/technology/chat). These include: defining one's screen name to be different than one's e-mail address; prohibiting children from participating in adult topics; and never giving out personal information such as phone, home address, or credit card data.

Additionally, some software systems block sensitive personal information from being transmitted through a pre-defined children's chat room or do not allow children and teens to use the Internet if their parents are not home, using time-limiting software. Other software applications limit access to a specific list of web sites that have been classified as inappropriate or bad, in that such sites contain profanity or subject matter of a sexual nature. Some filters block only the "bad" words, but not the surrounding text. Some filters apply to web sites, others to e-mail, chat, "instant" message systems, newsgroups, or a combination thereof. Most filters allow parents to turn off or edit the key word list.

Many companies that produce web sites voluntarily rate and label their sites, using a system knows as "PICS" (Platform for Internet Content Selection). This information can then be used for controlling access to web sites.

The invention seeks to improve upon the prior art by classifying or categorizing the age and/or other attributes of Internet (or other computer network) users based on an analysis of textual and other data generated or provided by the user. This information can then be used in a variety of ways by supervisory software systems, for example, to notify when a pair of people, such as an adult and child, are conversing or communicating about inappropriate subjects.

SUMMARY OF INVENTION

One aspect of the invention provides a method of classifying an anonymous user communicating over a computer network, such as by age, gender, or personal interests, based on the content generated or otherwise communicated by the user. The method includes: (a) providing sets of reference attributes, wherein each set of reference attributes is associated with one of a number of personal profile classes; (b) analyzing the user content in order to extract a set of attributes corresponding to such content; (c) comparing the set of extracted attributes against the plural sets of reference attributes in order to find a close match; and (d) associating the user with the personal profile class of the matched set of reference attributes.

In the preferred embodiment, the content is preferably text, and the attributes include one or more of the following: spelling errors; grammatical errors; verb usage; adjective usage; use of emoticons; and usage of words from one or more topical vocabularies.

Another preferred attribute is the proportion of words in the text that are found in a word vocabularies associated with each personal profile class. The classification system preferably builds these word vocabularies for each class by aggregating words from a plurality of known text samples used to train a classification system.

In preferred embodiment, the classification system employs a neural network, the nodes of which respectively represent the personal profile classes. A purality of training texts is provided. The system analyzes the training texts in order to extract a set of attributes corresponding to each text. The neural network is trained to establish weights for each node based on the training text attributes. Once training is completed, the nodal weights may function as a set of reference attributes for each personal profile class.

In the preferred embodiment, the neural network is trained by using a Kohonen self-organized mapping.

Another aspect of the invention relates to a method of identifying undesirable communications over a computer network between a first user and a second user. The method includes: providing sets of reference attributes, wherein each set of reference attributes is associated with one of a plurality of personal profile classes; providing pre-defined rules defining impermissible communication between various personal profile classes; analyzing text generated or provided by the first and second users in order to extract a set of attributes corresponding to the first and second user texts; comparing the set of extracted attributes for the first and second user texts against the plural sets of reference attributes in order to find close matches thereto; associating the first and second users with the personal profile classes of the first and second matched set of reference attributes; preventing the first and second users from communicating or otherwise signaling an alert in the event the personal profile class of the first user and the personal profile class of the second user contravene the rules.

Another aspect of the invention relates to a method of ascertaining an approximate age of an anonymous user communicating over a computer network. The method includes: providing plural sets of writing reference attributes, wherein each set of reference attributes is associated with one of a plurality of age classes, and wherein the reference attributes include at least one of spelling errors and grammatical errors; analyzing text or audio generated or provided by the user in order to extract a set of attributes corresponding to the text or audio; comparing the set of extracted attributes against the plural sets of reference attributes in order to find a close match; and associating the user with the age class corresponding to the matched set of reference attributes.

BRIEF DESCRIPTION OF DRAWINGS

The foregoing and other aspects of the invention will be understood with reference to a detailed description of the preferred embodiment and the following drawings, wherein:

FIG. 6 is an example of an approximate string matching process; and

DETAILED DESCRIPTION OF PREFERRED EMBODIMENTS

Figure 1A:
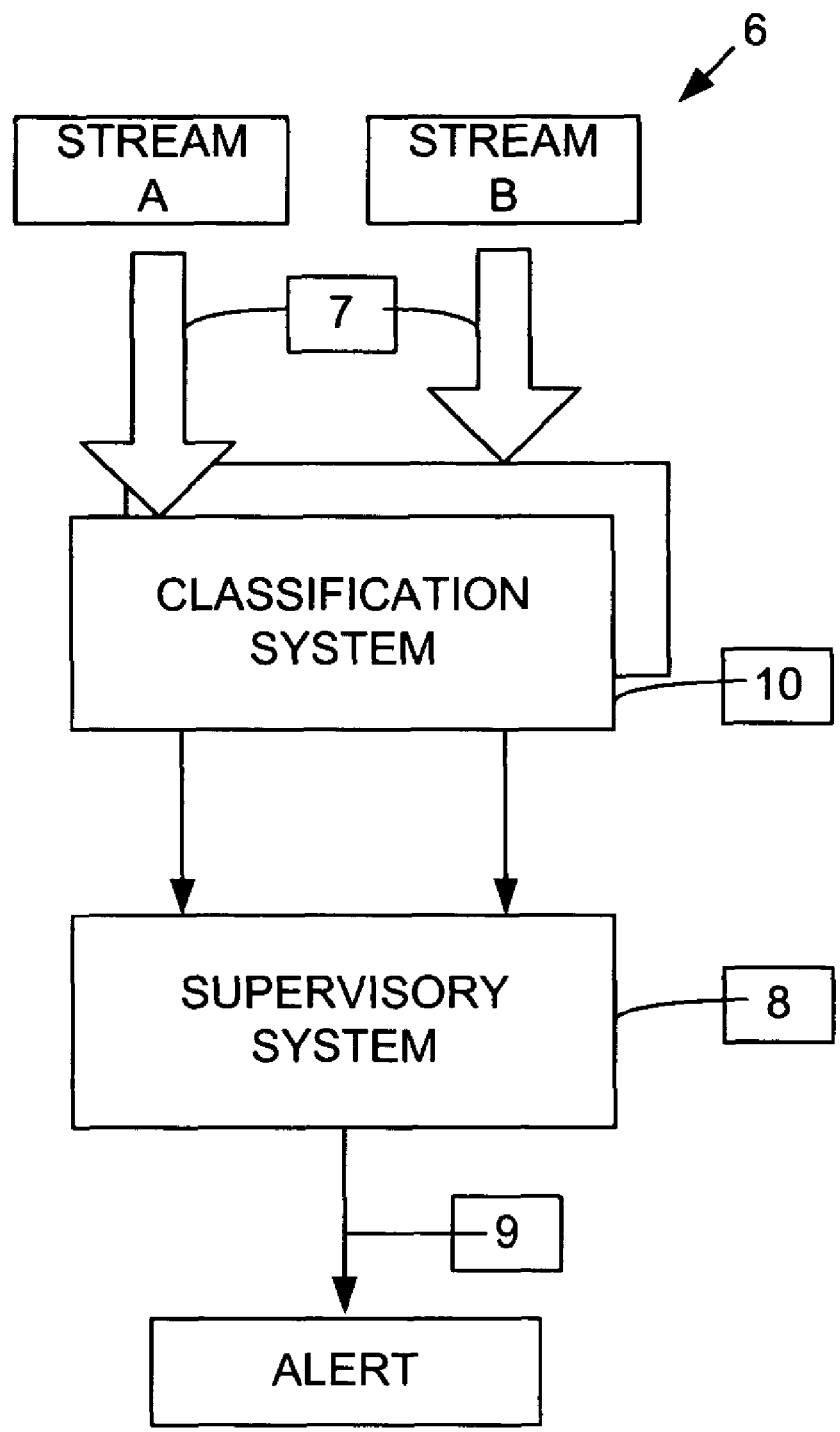
FIG. 1A is a block diagram of an alert system for undesired communications between users of a computer network.

FIG. 1A shows an analytical system 6 that provides an alert 9 in the event of 'undesired' communications between users of a computer network (not explicitly shown) such as the Internet. As shown in FIG. 1, the system 6 comprises two major components, a classification system 10 and a supervisory system 8.

The classification system 10 receives content 7 generated or provided by various users, two such users A and B being shown for purposes of example. Such content 7 is preferably text, but may also include multimedia content such as audio, video, graphics. The content may be in the form of data files or real-time data streams. The classification system 10 analyzes the content generated or provided by each user in order to extract a set of attributes corresponding to the content. The extracted attributes are then compared against plural sets of reference attributes in order to find the closest match. Each set of reference attributes corresponds to a personal profile class, described in greater detail below. Once a close or closest match is found, the classification system 10 associates each user with the personal profile class corresponding to the matched reference attributes.

It will be appreciated that the classification system 10 may require a minimum sample size in order to have sufficient data to make a reliable decision, and thus, for example, in a real-time application it may take some time before a sufficient quantum of content is collected by the classification system 10 before it can render a decision. It should also be appreciated that the content generated by any one user, who is typically identifiable by a user log in name, can be accumulated over a number of sessions to build up a large sample of that person's content. In such a case, the accuracy of the classification decision may be further improved. Once the system 10 renders what it perceives to be a reliable personal profile classification, the class decision for that user log-in name may be stored within the analytical system 6 for future use, thus reducing the processing load thereof.

The supervisory system 8 receives the output of the classification system 10, and executes pre-defined rules defining undesirable or impermissible communication between various personal profile classes. Thus, for example, if the classification system 10 decides that user A is an adult communicating an 'inappropriate' subject and user B is a child, the supervisory system 8 can signal an alert 9, which may be actionable in a variety of ways, for example, signaling a network operator or host, or simply recording the data in a log as evidence for later review.

Figure 1B:
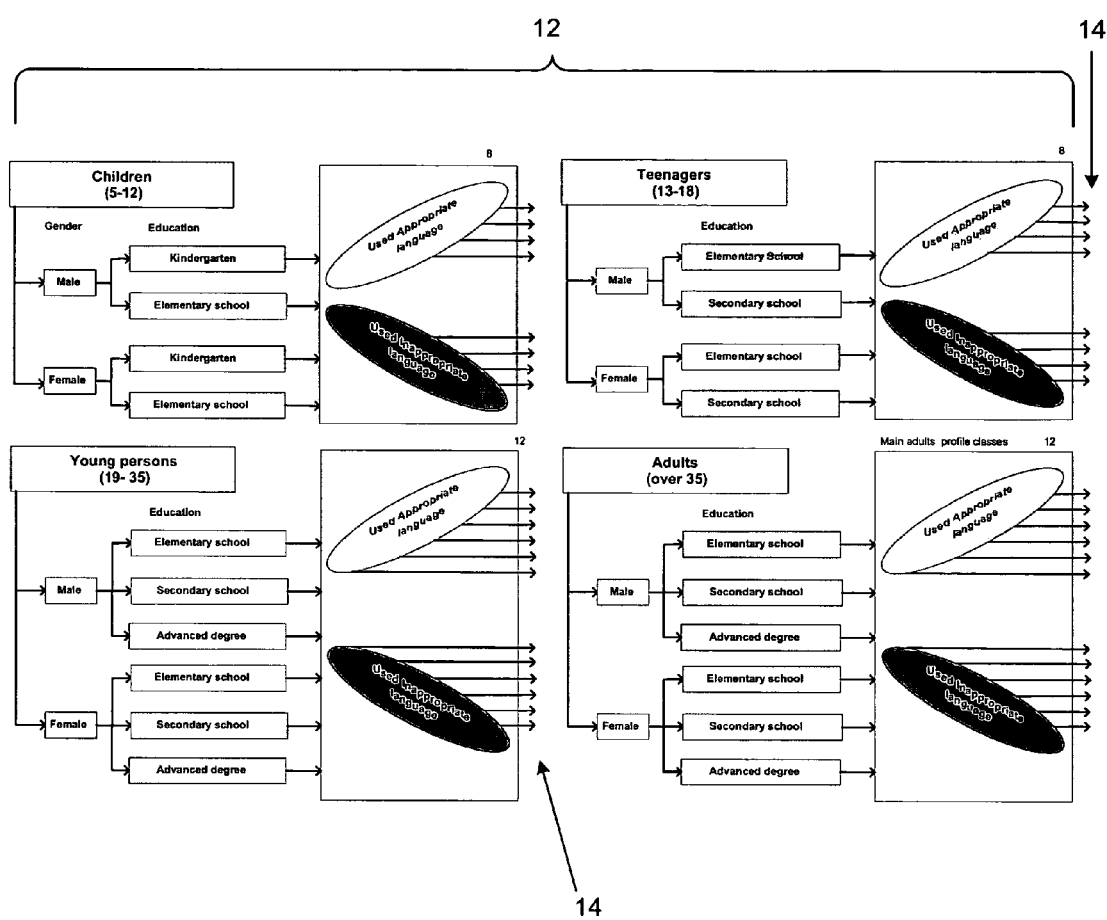
FIG. 1B is a dataset diagram showing various elements of a personal profile classification scheme.

The classification system 10 may be implemented by any suitable software language, and executed on a general-purpose computer. As illustrated in FIG. 1B, the preferred classification system 10 preferably provides a four-dimensional output result, [a,g,e,u] based on a predefined schema 12, summarized below:

Age (a) subdivided into 4 groups (a=0, 1, 2, 3):
    Child (5-12 years old), a=0;
    Teenager (13-18), a=1;
    Young person (19-35), a=2;
    Adult (over 35), a=3;
Gender (g), subdivided into two groups (g=0, 1):
    Male (g=0);
    Female (g=1);
Education degree/level (e), subdivided into four groups (e=0, 1, 2, 3):
    Kindergarten (e=0);
    Elementary school (e=1);
    Secondary school (e=2);
    Advanced (e=3) (College degree, University degree, PhD or Doctor Science degree)
Profanity level (which, if desired, could include terms relating to sexual activity, the use of pre-defined profane words and/or referencing links to web sites having such terminology):
    Appropriate language/material/words (u=0);
    Inappropriate language/material/words (u=1).

Collectively, the classification system 10 classifies text provided or generated by the user into one of M=40 personal profile classes $C_{a,g,e,u}$ 14. There are 8 classes for children, 8 classes for teenagers, 12 classes for young people, and 12 classes for adults, which compose the preferred individual personal profile classes. Note that M=40 because not all permutations are possible, e.g., a child will not have an advanced education level. The possible permutations and combinations of the classification schema is illustrated in FIG. 1B.

Figure 2:
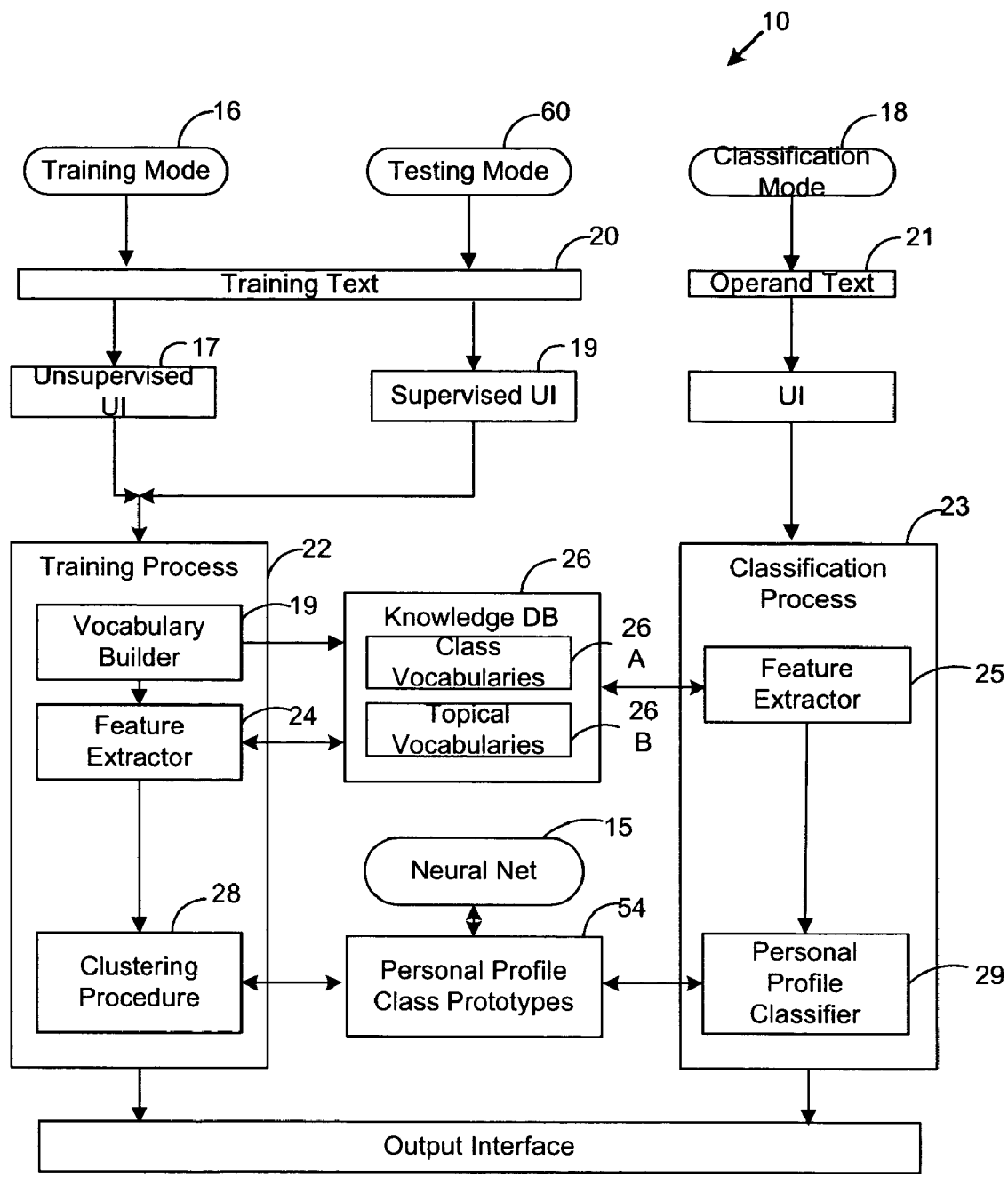
FIG. 2 is a basic system level diagram showing the design of a personal profile classification system.
Figure 7:
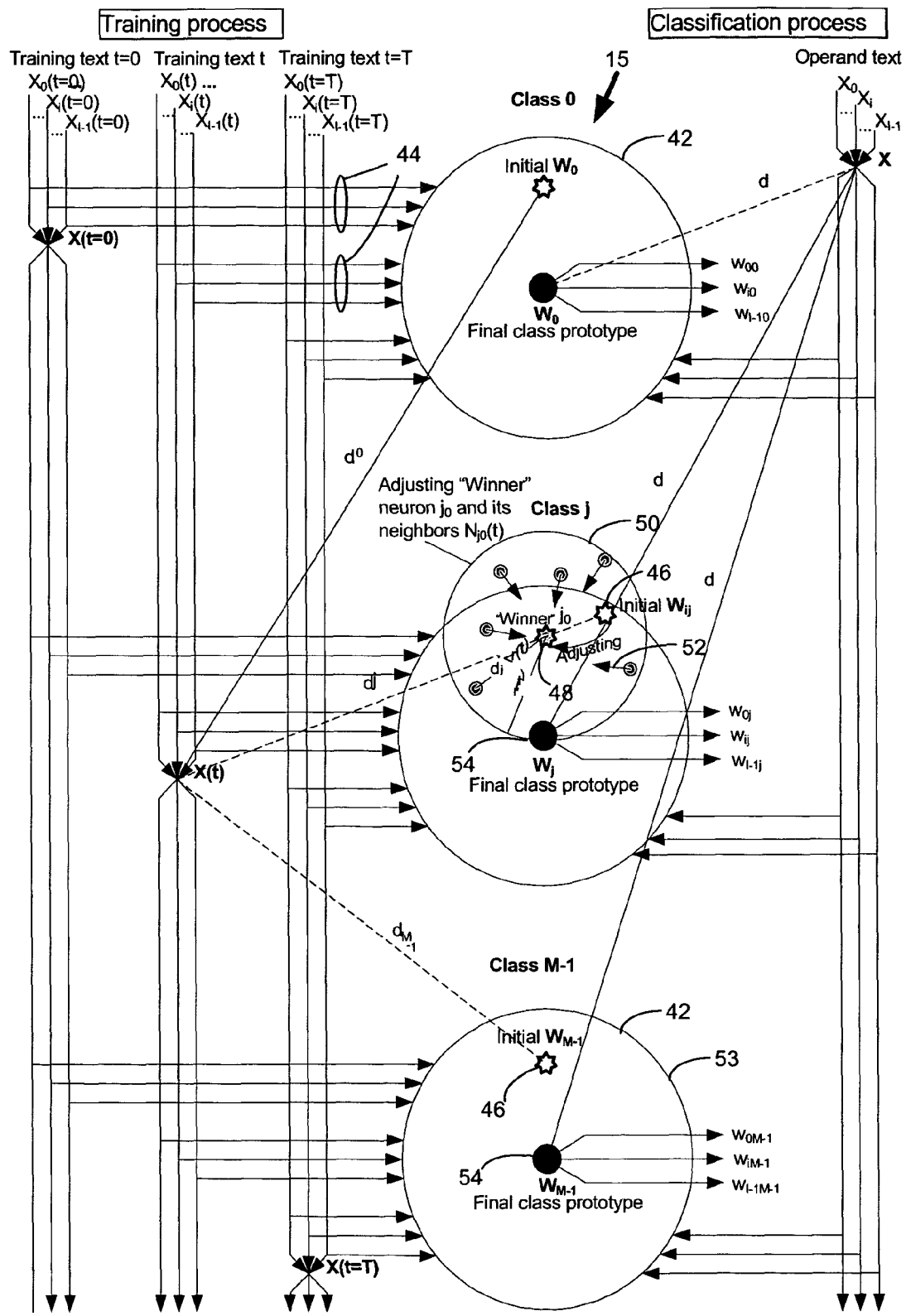
FIG. 7 is a diagram of a self-organizing neural network employed by the classification system.

FIG. 2 shows a simplified block diagram of the classification system 10, which in the preferred embodiment is based on a neural network 15 (see FIG. 7). The system 10 operates in at least a training mode 16, and also a classification mode 18. In the training mode 16 the neural net 15 uses imput text 20 in training process 22 designed to establish prototypes for each personal profile class (personal profile class prototypes) 54, as discussed in greater detail below. The personal profile class prototypes 54 provide a unique set of reference attributes for each personal profile class 14. In the classification mode 18, input text is analyzed to extract its attributes and compared against the reference attributes 21 by a classification process 23.

For the purposes of this description, unless the context dictates otherwise, the term "training text" will refer to input text 20 whose authorship and/or attributes may or may not be known, which is used to initially train the classification system 10. The term "operand text" refers to input text 21 fed to a trained system 10 for the purposes of subsequent analysis and classification.

The classification system 10 employs both unsupervised and supervised training, as indicated at user interface blocks 17,19. In supervised training, the authorship of the training text 20 is known enabling its attributes to be manually mapped to a personal profile class 14. In unsupervised training, the authorship of the training text 20 may not be known, requiring some means of structuring or organizing the attribution data thereof. In the preferred embodiment unsupervised training uses the methodology of a Kohonen self-organizing map, which, as known to those skilled in the art, is capable of clustering data having similar features, and hence is useful in identifying a set of attributes representative of each class, which can then function as reference attributes for classification purposes. A more detailed exposition of the Kohonen methodology is found in:

Taner, "Kohonen's Self Organizing Networks with Conscience", Rock Solid Images, November 1997; and Kunchev et al., "Handwritten Symbol Recognition Algorithm Based on a Modified Self-Organizing Neural Network", International Conference on Telecommunications 1996, April 1996, Istanbul, Turkey the contents of which are incorporated by reference herein.

For training purposes, the classification system 10 employs as sample data one thousand samples of training text 20, preferably with minimal 100 words whose authorship is known, for at least each one of the 40 individuals personal profile classes 14, resulting in 40×1000=40 000 samples of training text 20 for training process 22. The training text 20 is analyzed to extract values for a variety of attributes or recognition features, discussed below.

Figure 3:
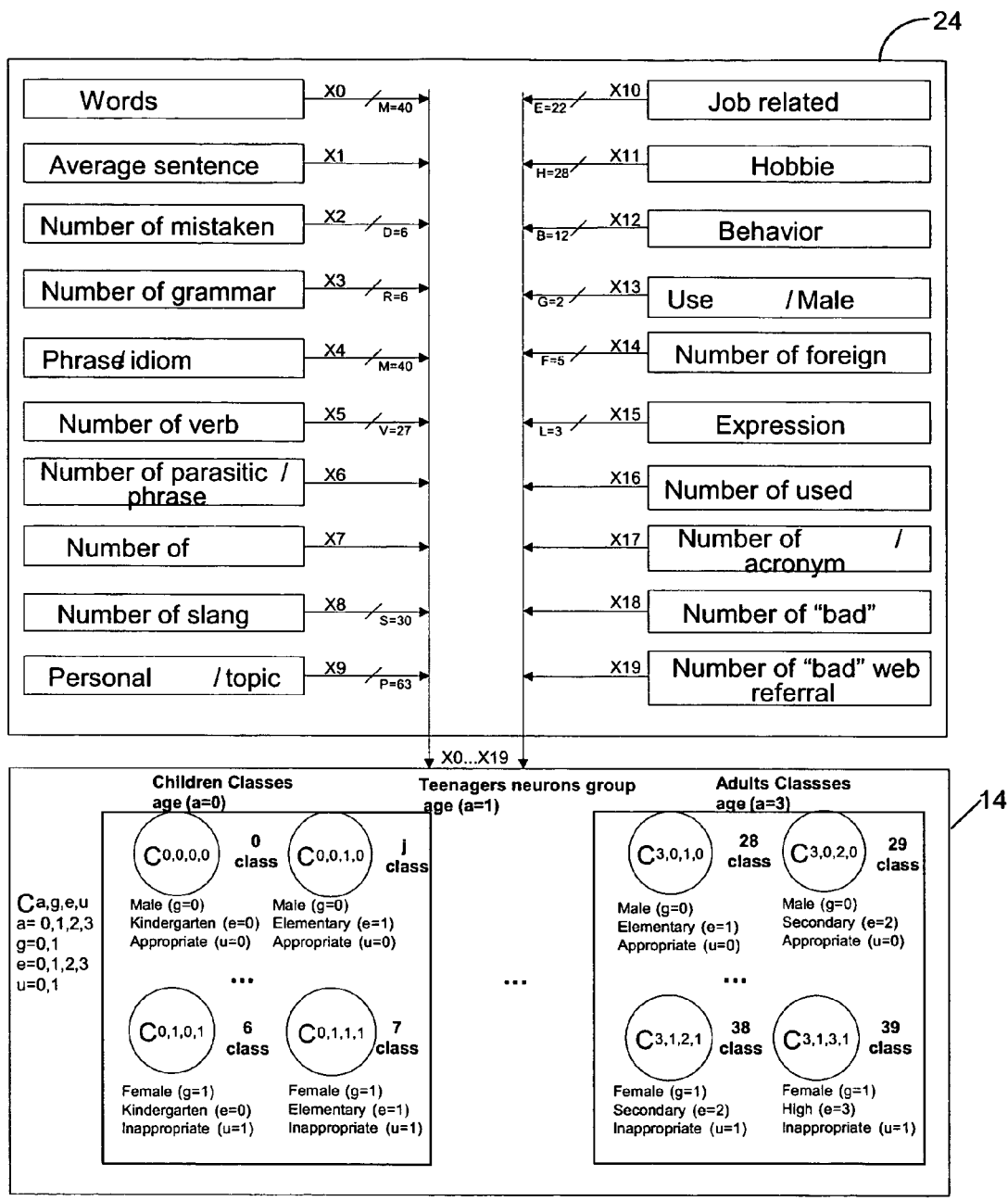
FIG. 3 is a data diagram showing employed by the classification system.

Referring additionally to FIG. 3, the classification system 10 preferably employs twenty different attributes or recognition features $X_0$-$X_{19}$ organized into four different groups, based on the nature of the data processing required to extract the attribute or recognition feature from the text. Some of the attributes or recognition features (such as $X_0$, $X_2$-$X_5$, and $X_8$-$X_{15}$) are multi-component vectors. In general, the data for each attribute or recognition feature (or component thereof) is normalized in the range [0,1] by finding the maximum value for the attribute or feature and scaling the input value against the maximum input value found during training. This normalization prevents any one attribute or recognition feature from dominating the clustering of data in the Kohonen self organizing mapping.

A first group of attributes or recognition features is based on building a vocabulary for each personal profile class 14 during the training process, and on matching words in the operand text to the built-up vocabularies in the classification process:

$X_0$—Words Vocabulary

For this recognition feature, as part of the training process 22, a vocabulary builder 19 generates a vocabulary of all significant words present in the training text 20, in aggregate, for each defined class 14, thus resulting in the establishment of forty different word vocabularies 26A, which are stored in a knowledge database (DB 26).

Non-significant words, such as indefinite/definite articles, conjunctions, prepositions, and repeated words are eliminated from consideration in each vocabulary.

The attribute or recognition feature $X_0$, which is calculated for the operand text 21 by a feature extractor 24B in classification process 23, is a vector with the number of components equal to the number of personal profile classes 14.

$X_0 = \{X_0^0, X_0^1, \ldots X_0^j, \ldots, X_0^{M-1}\}$, ($j=0 \rightarrow M-1$, $M=40$)

The value of each vector component $X_0^j$ is in the interval [0,1] and is proportional to the number of words in the operand text 21 used from the vocabulary 26A associated with the corresponding personal profile class 14. Thus, for example, $X_0^5$ for class $C_{0,0,1,0}$ (Children/Male/Elementary School/Appropriate Language) will have a value close to 1 if substantially all of the words of a given operand text 21 are found in the word vocabulary for class $C_{0,0,1,0}$.

A second group of attributes or recognition features $X_1$-$X_3$ pertains to writing and error statistics, as follows:

$X_1$—Average Sentence Length

For this attribute or recognition feature, the feature extractor 24 calculates the average number of words per sentence or statement in the training text 20 during the training process 22, or operand text 21 during the classification process 23. The value of $X_1$ is normalized to the interval [0, 1] and is calculated for each text as the average number of words per sentence or statement in the text divided by the highest average number of words per sentence or statement found in the training text, in aggregate. (In the event the result is greater than 1, the value is truncated to 1).

$X_2$—Number of Mistaken Words

This attribute or recognition feature is calculated after spelling and grammar checks are carried out on the text under analysis, as known in the art per se. In the preferred embodiment, $X_2$ is a vector having components $X_2^0, X_2^1, \ldots, X_2^{D-1}$, (D=6) representing 6 components corresponding to various types of mistakes, described below, which are a helpful criterion for identifying the writer's grammar level or education. Again, the value of these components $X_2^0, X_2^0, \ldots, X_2^{D-1}$ is normalized to be in the interval [0, 1]. The number of mistakes is tabulated by feature extractor 24 during the training process 22 for the training text 20, as well as during the classification process 23 for the operand text 21. More particularly, the six types of errors tabulated for this attribute or feature include:

$X_2^0$—missed characters;

$X_2^1$—inserted characters;

$X_2^2$—directly replaced characters;

$X_2^3$—characters with changed places (for example: swaps-"eudcation" instead of "education");

$X_2^4$—language-specific errors;

$X_2^5$—characters repeating many times.

$X_3$—Number of Grammar Errors

This attribute or recognition feature is similar to $X_2$ and is calculated after spelling and grammar checks are carried out, as known in the art per se. In the preferred embodiment, $X_3$ is a vector having components $X_3^0, X_3^1, \ldots, X_3^{R-1}$, (R=6) representing 6 sub-features corresponding to various types of mistakes, described below, which are a helpful criterion for estimating the writer's grammar level or education. The feature extractor 24 tabulates the number of mistakes in the training text 20 during the training process 22, as well as the operand text. The preferred types of grammatical errors recognized by this feature are:

$X_3^0$—Wrong sentence's words order;

$X_3^1$—Missing/wrong punctuation symbol;

$X_3^2$—Incorrect upper/lower case letter;

$X_3^3$—Wrong verb form;

$X_3^4$—Missed verbs, as criterion of native English speakers.

$X_3^5$—Wrong preposition, as a criterion of non-native English speakers

A third group of attributes or recognition features is based on Artificial Intelligence methods. In these methods, the training and operand text 20, 21 are first matched to topical vocabularies 26B stored in knowledge (DB) 26 in order to extract certain statistical data.

$X_4$—Phrases/Idioms Vocabulary

This attribute or recognition feature is a vector having 4 components $X_4=\{X_{04}^0, X_4^1, \ldots, X_4^j, \ldots, X_4^{M-1}\}$, (j=0→M−1; M=40). As part of the the vocabulary builder 19 generates a vocabulary of all significant phrases or idioms present in the training text, in aggregate, for each personal profile class 14. In the alternative, such a topical vocabulary may be preloaded in the knowledge DB 26. Some phrase/idiom examples are: "You're welcome"; "As far as I'm concerned"; "Come off it"; and "Fair enough". Such idioms can be a criterion for recognition of informal English used by native English speakers. For each class, the phrase/idiom vocabulary is created by aggregating all the phrases/idioms employed in all of training text samples of the class. In the training and classification process 22, 23, attribute $X_4^j$ is a normalized value [0, 1] of the number of phrases used from the phrase vocabulary 26B of each personal profile class 14.

$X_5$—Number of Verb Tenses

The number of verb tenses, as well as the number of verbs, present in text can function as an indication of the writer's education level. For the training process 22, the feature extractor 24 extracts and counts the number of instances of each of 27 different verb tenses $X_5^0, X_5^1, \ldots, X_5^{V-1}$, (V=27), present in the training text. The frequency of each verb tense is normalized to be in the interval [0,1], thus characterizing the text. For the classification process 23 feature extractor 25 counts the number of instances of each of 27 different verb tenses in the operand text 21, and normalizes the count to the interval [0, 1,]. If desired, this criterion can also assist the system 10 in determining whether or not the writer is a native English speaker. The verb tenses are:

Active $X_5^0$-$X_5^{12}$: Present; Past; Present Progressive; Past Progressive; Present Perfect; Past Perfect; Present Perfect Progressive; Past Perfect Progressive; Modal Base Form; Modal Progressive; Modal Perfect; Modal Perfect Progressive Passive $X_5^{13}$-$X_5^{25}$: Present; Past; Present Progressive; Past Progressive; Present Perfect; Past Perfect; Present Perfect Progressive; Past Perfect Progressive; Modal+Base Form; Modal Progressive; Modal Perfect; Modal Perfect Progressive Total number of verbs $X_5^{26}$, which functions as a criterion for distinguishing between males and females, as males typically use more verbs than females $X_6$—Number of Parasitic Words/Phrases.

In the training and classification processes 16, 18, the training text and the operand text are each respectively analyzed during the training and classification processes 22, 23 to determine the normalized number of parasitic words and phrases in the text. These include words or phrases such as: "I see"; "Really"; "I've got", or "By the way" and are denoted or stored in the knowledge DB 26.

$X_7$—Number of Adjectives

In the training and classification processes 22, 23, the training text and the operand text are each analyzed to determine the normalized number of adjectives. These are denoted or stored in the knowledge DB 26. This criterion assists in distinguishing between the sexes, as females tend to use adjectives more than males.

$X_8$—Number of Slang Words

In the training and classification processes 22, 23, the training text and operand text are each analyzed to determine the normalized number of instances that slang words or phrases are employed, based on a variety of slang vocabularies denoted or stored in the knowledge DB 26. In the preferred embodiment, attribute or recognition feature $X_8$ is a vector $X_8^0, X_8^1, \ldots, X_8^{S-1}$, (S=30) enabling the classification system 10 to track usage of 30 different slang vocabularies, as follows:

International Geographically-based slang: South African, Bahamian, American, Australian American, British, Scottish, Irish, Australian British, British New Zealand, Jamaican, Canadian, Hawaiian, American Japanese.

College Slang: Cyber Dorktionary, Maryland Academic Lexicon, Willamette University.

General Slang: Gay, Devil's, Disco, Drug, IRC Slang, Jargon, Unofficial Rap, Urban.

Sports Slang: Body Boarding, Climbing, Mountain Bike, Roadie Slang, Hockey, Boards.

This attribute is useful in determining the origin of the writer and/or his or her personal interests, which may be an optional classification output provided by the system 10.

$X_9$—Personal Interests/Topics

In the training and classification processes 22, 23, the training text and operand text are each respectively analyzed to determine the normalized number of instances that the text uses terms or key words from a variety of topical vocabularies stored 26B in the knowledge DB 26 reflecting different fields of interest or topics. In the preferred embodiment, $X_9$ is a vector $X_9^0, X_9^1, \ldots, X_9^{P-1}$, (P=63), enabling the tracking of 63 fields of interest. These include Art; Astronomy; Artists: Audio & Video; Business; Cars; Celebrity Fans; Clothing; Children; Collections; Computers; Culture; Crafts; Dances; Education; Ecology; Entertainment; Famous People; Family; Finance and Corporate; Fitness; Food & Recipes; Games; Government; Health and Beauty; Herbs/Smudge; History; Hobbies; Home Automation; Household Product Games; Government; Internet; Issues & Causes; Job; Lifestyle; Love; Maps; Media; Museums; Movies & TV; Music; Mystics; Native Nations; News & Media; Organizations; Outdoors; Parenting; Parties; Pet & Animals; Pension; Poetry/Essays; Publishing; Relations Religion; Retail Stores/Legends; Science; School; Social; Skills; Space; Sporting & Athletic; Sports; Travel; Web design; and Women. This attribute or recognition feature is believed to be useful because the type of topic is often indicative of age group. For example, the Children class will more likely be associated with topics such as computer games, sports, family, animals, friends, films, and animations. The Teenagers class will more likely be associated with topics such as games, music, love, entertainment, school, and sport. The Young Persons class will more likely be associated with topics such as job, society, college, university, computers, programming, love, sport, and traveling. The Adults class will more likely be associated with topics such as social, pension, family, science and job themes, and health. Like attribute $X_8$, the personal interests recognition feature is useful in determining the personal interest of the writer, which may be an optional classification output provided by the system 10.

$X_{10}$—Job Related Terms

In the training and classification processes 22, 23, the training text and operand text are each respectively analyzed to determine the normalized number of instances that the text employs terms or key words from a variety of topical vocabularies 26B stored in the knowledge DB 26 reflecting different professional terminology. In the preferred embodiment, $X_{10}$ is a vector $X_{10}^0, X_{10}^1, \ldots, X_{10}^{E-1}$, (E=23), representing 23 vocational terminologies. These include Accounting/Finance, Computer related (Internet), Computer related (Other), Consulting, Customer service/Support, Education/Training, Engineering, Executive/Senior Management, General Administrative/Supervisory, Government/Military, HP/Personnel, IS/IT Management, Manufacturing/Production/Operations, Professional (Medical, Legal, etc.), Research and Development, Retired, Sales/Marketing/Advertising, Self-employed/Owner, Student, Unemployed/Between jobs, Homemaker, Tradesman/Craftsman. This attribute or recognition feature is believed to be useful because vocational terminology can often be indicative of age group, educational level or personal interest of the writer, which may be an optional classification output provided by the system 10.

$X_{11}$—Hobbies

In the training and classification processes 22, 23, the training text and operand text are each respectively analyzed to determine the normalized number of instances that the text employs terms or key words from a variety of vocabularies stored in the knowledge DB 26 reflecting different hobbies. In the preferred embodiment $X_{11}$ is a vector $X_{11}^0, X_{11}^0, \ldots, X_{11}^{H-1}$, (H=28), enabling 28 different hobby vocabularies. These include: Animal-related, Aquariums, Arts and Crafts, Chemistry, Collecting, Computer-related, Cooking, DIY (Do It Yourself), Electronics, Fan/fiction, Film-making, Games, History, Home brewing, Interactive fiction, Internet-based hobbies, Literature, Machining, Model (scale model) building, Motor vehicles, Music, Observation, Outdoor nature activities, Photography, Physics demos or experiments, Puzzles, Research-related, Sports or other physical activities. Like $X_9$, this recognition feature assists in identifying the primary classes because the type of hobby is often indicative of age group. Like $X_8$, the hobby attribute or recognition feature is useful in determining the age group or personal interest of the writer, which may be an optional classification output provided by the system 10.

$X_{12}$—Behavioral Profile

In the training and classification processes 22, 23, the training text and operand text are each respectively analyzed to determine the writer's tonal style. These include very kind; polite; normal; cold; rude; vulgar; passive; active; authoritative (used imperative statement forms); diplomatic, aggressive; embarrassing. In the preferred embodiment, $X_{12}$ is thus a vector $X_{12}^0, X_{12}^1, \ldots, X_{12}^{B-1}$, (B=12), each component of which tracks usage of the various tonal styles.

$X_{13}$—Use of Female/Male Names

In the training and classification processes 22, 23, the training text and operand text are each respectively analyzed to determine usage of male or female names in the greeting lines of the training or operand text, thus assisting in determining the writer's gender. Attribute or recognition feature $X_{13}$ is a two component Boolean vector that tracks such usage.

$X_{14}$—Number of Foreign Words $X_{14}$ is a multi-component vector $X_{14}^0, X_{14}^1, \ldots, X_{14}^{F-1}$, (F=5), which tracks the normalized number of terms or key words in the training text and the operand text from a variety of different foreign language vocabularies, such as Latin, French, German, Italian, Spanish. This criterion assists in identifying the writer's educational level and optionally his or her origin, which may be an optional output of the classification system.

$X_{15}$—Formal/Informal Expressions

Attribute or recognition feature X14 is a multi-component vector, $X_{15}^0, X_{15}^1, \ldots, X_{15}^{L-1}$ L=3 which tracks the normalized number of formal, informal or literal expressions present in the training text and operand text.

$X_{16}$—Number of Emoticons

Attribute or recognition feature $X_{16}$ is a normalized count of the number of chat symbols or emoticons the users employ in the training text or operand text to express feelings. Emoticons are stored in the knowledge DB 26, which may be updated from time to time, and include, for example:

:-) Smiley
;-) Winked smiley
:-> Devilish grin
:-( Frown face
8-) User wears glasses
(-: Left handed smiley
:-{) User has a mustache
[:-) User is wearing a walkman
%-) User's been staring at the screen too long It is believed that children are more likely use to such symbols more frequently than adults, and thus this attribute or recognition feature can aid in estimating or characering the writer's age.

$X_{17}$—Number of Abbreviations/Acronyms

Attribute or recognition feature X17 is a normalized count of the number of abbreviations or acronyms employed in the training text or operand text. These include, for example: AEAP—As Early As Possible, ASAP—As Soon As Possible; bb—Bye Bye; BITW—Best In The World; CC—Carbon Copy and others, stored in the knowledge DB 26, Technical acronyms: HDTV—High definition TV, STB-Set Top Box, DVB-Digital Video Broadcasting. It is believed that younger persons are less likely use to such symbols than adults, and thus this attribute or recognition feature can aid in estimating the writer's age.

A fourth group of attributes or recognition features is based on searches against pre-ordained vocabularies 26B stored in the knowledge DB 26 of "bad" words or "bad" web sites.

$X_{18}$—Number of "Bad" Words.

This attribute or recognition feature is a normalized count of the number of undesirable words employed in the training text or the operand text.

$X_{19}$—Number of "Bad" Web Site Referrals

This attribute or recognition feature is a normalized count of the number of undesirable URL links contained in the training text or operand text. Typically these links include sites that are sexual in nature, contain violent or hateful material, or which advocate the use of weapons or harmful substances such as alcohol, tobacco, or illegal drugs.

Figure 4:
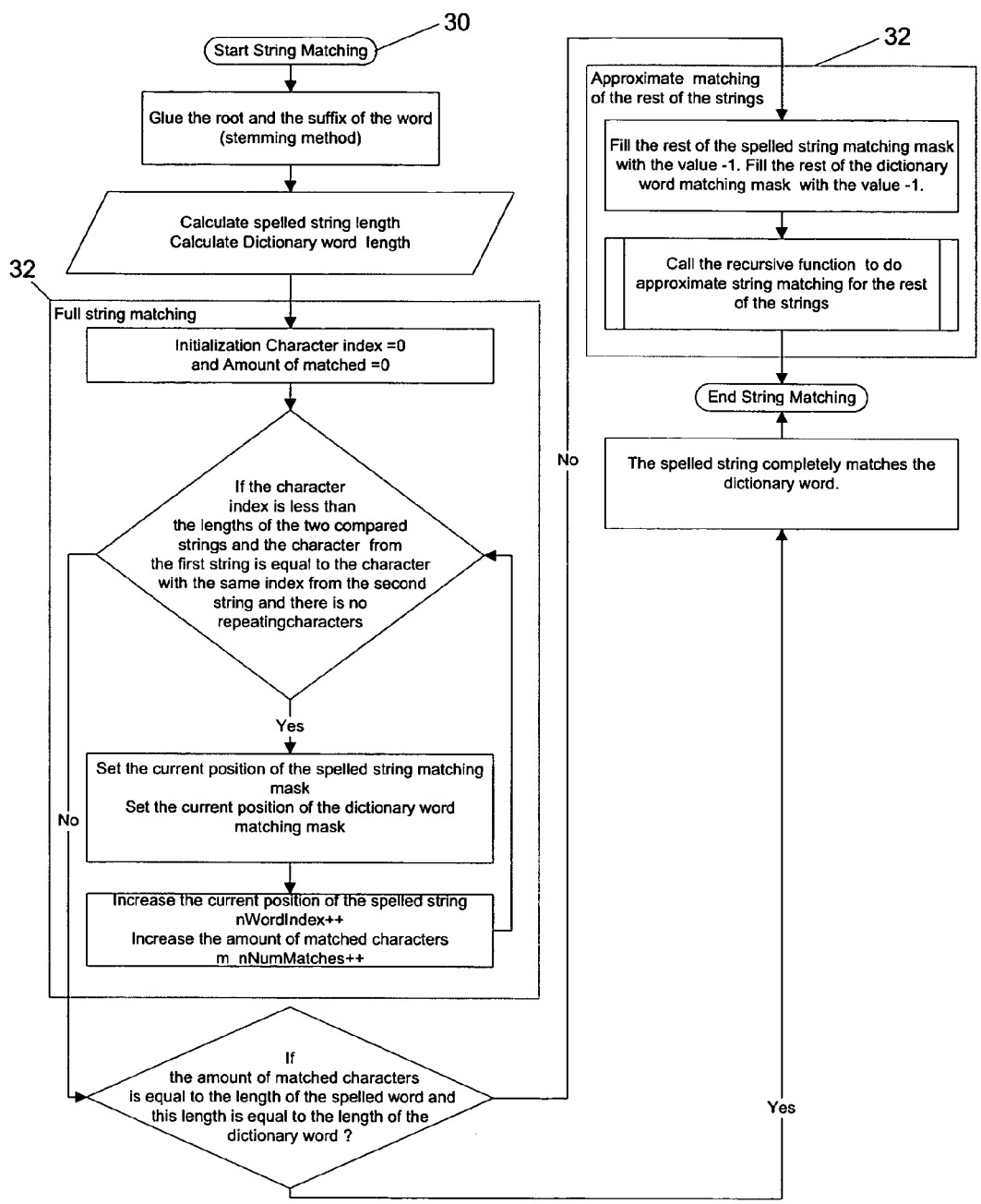
FIG. 4 is a flowchart of an algorithm for matching word-strings against a dictionary.

FIG. 4 shows the main dataflow of an algorithm 30 for matching word strings to words in vocabularies stored in the knowledge database 26. This algorithm and its functions use the various vocabularies 26A, 26B (including, inter alia, words, phrases, topics, job terms, slang, jargon, chat symbols, and "bad" keywords) to recognize words in order to extract many of the attributes or recognition features discussed above.

The algorithm 30 preferably uses a stemming method for the spelling and searching functions. This involves finding the root and the suffix of a word—thus enabling other words to be found with the same root. The stemming is preferably carried out through use of a stemmed dictionary, wherein every word is separated into its root and suffix. Words that have common meaning are separated to one and the same root, but there are many exceptions, such as "mouse" and "mice", for example, which are placed in a separate table. All roots and suffixes are placed in two separate tables in the database, and each dictionary is realized like a third table, in which for every word there are indexes of its root and suffix.

For each word-string analyzed, a search is carried out in the different vocabularies or dictionaries using algorithm 30, which returns the word that best matches a given input string (the "spelled string") with a minimum amount of errors. The spelling check is accomplished by comparing the spelled string with the best matching word from the dictionary and checking how many different types of errors exist between the spelled string and the dictionary word.

Figure 5:
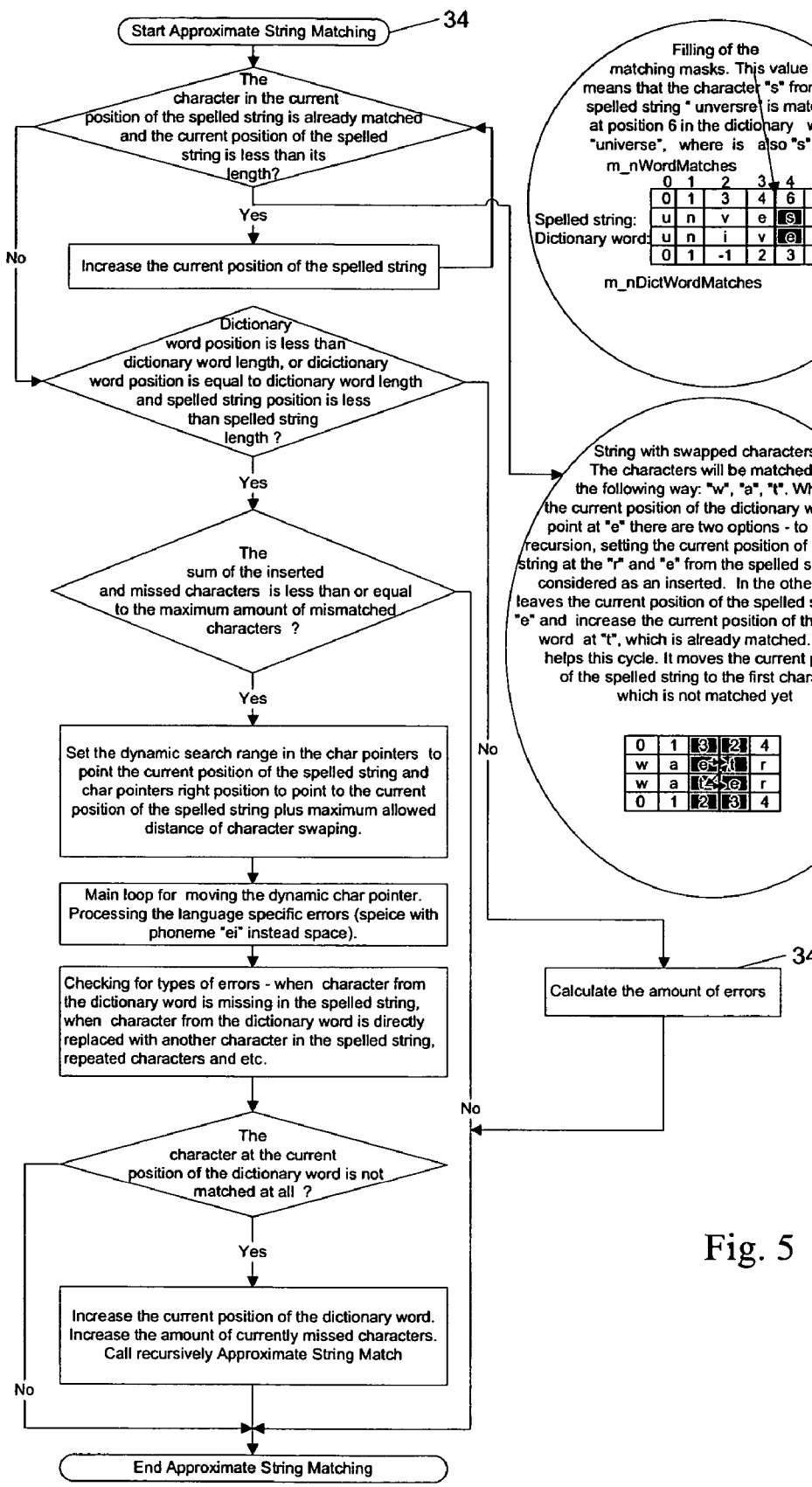
FIG. 5 is a flowchart of an algorithm for the approximate matching of word-strings against a dictionary.

Algorithm 30 employs two types of matching—full string matching 32, shown in FIG. 4, and approximate string matching 34, the details of which are shown in FIG. 5. The full string matching function 32 is carried out, as shown in FIG. 4, by finding exact matching between the search word and one of the dictionaries' words. If a full match is not found, then the algorithm 30 calls the recursive approximate string matching function 34.

The approximate string matching function 34 does the approximate matching of two strings by finding, for each character of the spelled string, the position of the same character in the dictionary string to which it can be matched. At the end, the function 34 calls another function 36 to make the final calculation of the number of errors (differences) between the two strings. This function, particularly useful with respect to attribute $X_2$, recognizes 6 types of errors: missed characters; inserted characters; directly replaced characters; characters with changed places (swaps); language-specific errors; and repetitive characters.

An example of approximate string matching for different kind of errors is shown in FIG. 6. In this illustration, every table 40 gives the state of one depth of the recursion. Grayed cells show the characters that are matched at the current depth of recursion. The first line of every table is a mask, m_nWordMatches, for the spelled string. The second line is the spelled string, which is "waqster" in this example. The third line is the dictionary word, which is "water" in this example. The fourth line is a mask, m_nDictWordMatches, for the dictionary word. The cells of each mask are initialized to a "−1". In this example, the error type is two inserted characters "q" and "s". Only those threads of recursion, which give the minimum amount of errors, are shown. There may be many other execution threads, but they do not give the best results, so they are not shown.

Table 40a shows the state of processing of function 34 after full string matching. Processing stops before "a", because "a" is a language-specific phoneme.

Table 40b shows the state of processing after recursion depth 1, where a match is found for letter "a" at position 1 of both the spelled string and the dictionary string. The two masks, m_nWordMatches and m_nDictWordMatches are set to "1" at cell #1 to denote a character match at string position 1. Table 40c shows the state of processing after recursion depth 2. Here, character "t" from the dictionary word is first compared to character "q", then ahead in the spelled spring to characters "s" and "t". Accordingly, cell #4 of the spelled string mask m_nWordMatches is set to "2" to denote a match in the $2^{nd}$ position of the dictionary string, and cell #2 of the dictionary mask m_nDictWordMatches is set to "4" to denote a match in the $4^{th}$ position of the spelled string. Table 40d shows the state of processing after recursion depth 3. The current position of the dictionary word moves ahead by one position to the character "e" and the current position of the spelled string moves ahead after the position of the last matching to the character "e". The successful matching of "e" results in cell #5 of the spelled string mask m_nWordMatches being set to "3" to denote a match in the $3^{rd}$ position of the dictionary string, and cell #3 of the dictionary mask m_nDictWordMatches being set to "5" to denote a match in the $5^{th}$ position of the spelled string. Likewise, as shown in table 40e, cell #6 of the spelled string mask m_nWordMatches is set to "4" to denote a match of "r" in the $4^{th}$ position of the dictionary string, and cell #4 of the dictionary mask m_nDictWordMatches is set to "6" to denote a match in the $6^{th}$ position of the spelled string. Thus the two inserted characters "q" and "s" will not be matched and 2 errors will be identified.

FIG. 7 is a schematic illustration of the self-organizing neural network 15 employed by the classification system 10, which incorporates forty neurons 42 (representing the forty personal profile classes 14) in a one-layer topology. Each neuron 42 has twenty inputs 44, one for each of the attributes or recognition features $X_0$-$X_{19}$.

Each neuron 42 is also associated with a weight vector $W_j$ comprising twenty weights per neuron, which are respectively applied to each neural input 44. In total, there are $w_{ij}$ weights, where ($0 \leq i \leq I-1=19$; $0 \leq j \leq M-1=39$), i being an index to the input attributes $X_i$ and j being an index to the neurons or personal profile classes.

The training process 22 involves finding the neuron with weights closest to the attributes or recognition features of each training text 20, and declaring that neuron as the 'winner'. Then the weights of all the neurons in the vicinity of the winner are adjusted. The process is continued for all forty thousand iterations t of the training text samples, and in the process, the 'neighborhood' of each neuron is reduced as discussed in greater detail below. At the end of the process, each neuron 42 represents a personal profile class 14, and the associated weight vector $W_j$ represents the 'class prototype' 54, which functions as a set of reference attributes for the class 14.

The clustering or mapping procedure for generating class prototypes is shown at block 28 (FIG. 2) of the training process 22. The procedure is also schematically represented in FIG. 7 and comprises the following steps:

1. Initialize the weights $w_{ij}$ of the neurons 42 with small random values. This results in the 'initial' weight vectors $W_j$ ($0 \leq j \leq M-1$) (ref. no. 46) shown in FIG. 7.

2. Compute the Euclidean distance $d_j$ from the vector of attributes $X_0$-$X_{19}$ for a given training text sample t (the vector being denoted as X(t), with each component being denoted as $X_i(t)$), to all neurons, as follows.

$$d_j = \sqrt{\sum_{i=0}^{I-1}(X_i(t) - \omega_{ij}(t))^2}.$$

3. Find the neuron $j_0$ with the smallest distance $d_j$, and hence the greatest similarity. This is deemed the 'winner'.

4. Adjust the weight vector $W_{j0}$ (ref. no. 48) of the winning neuron $j_0$ to more closely match the attribute vector X(t) of the current training text sample t, as follows $$\omega_{ij0}(t+1) = \omega_{ij0}(t) + a(t)(X_i(t) - \omega_{ij0}(t)),$$

where a(t) is a learning parameter that is used to control the convergence rate in the training process.

5. Determine a neighborhood $N_{j0}(t)$ (ref no. 50) around the winning neuron. The weight vectors $W_j$ for neurons within neighborhood $N_{j0}(t)$ will be updated, whereas neurons outside $N_{j0}(t)$ are less affected. The neighborhood may be computed by finding a radius r(t) that decreases as the number of iterations grow. In the preferred embodiment $r(t) = b(t) \cdot d_{max}$, where $d_{max}$ is a maximum distance in the Euclidian space between neurons, and $b(t) = 0.1(1-t/T)$, T being the maximum number of iterations.

6. Calculate the distance $d_j^*$ between the 'winner' neuron $j_0$ and all other j neurons.

$$d_j^* = \sqrt{\sum_{i=0}^{I-1}(\omega_{ij_0}(t) - \omega_{ij}(t))^2}.$$

7. Correct/adjust (schematically represented by ref. no. 52) the weight vector $W_j$ of each neuron if its distance to the winner $d_j^* \leq r(t)$.

$$\omega_{ij}(t+1) = \omega_{ij}(t) + a(t)(X_i(t) - \omega_{ij}(t))$$

A suggested learning parameter that provides a linear decreasing function is $$a(t) = b(t)\frac{r(t) - d_j^*}{r(t)}$$

8. If the training process reaches the maximal number of input training text samples T=40×1000, stop; otherwise, go to the next input text sample t+1 and extract its attribute vector X(t+1), repeating the above with t=t+1.

At the end of the foregoing unsupervised clustering procedure, the neighborhood 53 about each neuron 42 will represent a cluster of similarly valued attribute vectors X(t), thus representing one personal profile class 14. The final weight vector $W_j$ of each neurons represents a best class prototype 54, that functions as a set of reference attributes.

In the preferred embodiment, an operator preferably manually reviews the class prototypes to determine whether or not they appear to conform to the underlying personal profile classes. In addition, it will be recognized that some of the attributes or recognition features discussed above are not readily amenable to an unsupervised clustering procedure. For example, attribute $X_0$ uses vocabularies built from all training text samples for each personal profile class as a comparison base to determine the statistical usage of such vocabularies for each training sample. In this case, a pre-processing stage may be required wherein the vocabularies are first established from known training text samples so that the components of $X_0\{X_0^0, X_0^1, \ldots, X_0^j, \ldots, X_0^{M-1}\}$ can be calculated for the purpose of the unsupervised clustering procedure. Alternatively, $X_0$ may be omitted from the unsupervised clustering procedure and manually mapped to the neurons by setting $W_{0j}$ (the neural weight corresponding to attribute input $X_0$) to the Gaussian mean of the corresponding $X_0$ component.

Once the unsupervised and/or supervised clustering procedure is completed, the weights $W_j[\omega_{0j}, \omega_{1j}, \ldots, \omega_{I-1j}]^T$, j=0→M−1=39 can be used as set of reference attributes for the classification process.

Referring to FIGS. 2 and 7, in the classification process 23, feature extractor 25 creates an operand attribute or recognition feature vector X $\{X_0-X_{19}\}$ from the operand text 21. A classifier block 29 employs the nearest neighbour approach to find the neuron 42 most closely related to the operand attribute vector X. As a matching criterion the Euclidean distance d is used to find the neuron closest to the operand vector X. For an operand text with attribute vector X, if $$d = \|X - W_{j_0}\| = \min_j \|X - W_j\|,$$

then the operand text 21 associated the personal profile class of $W_{j_0}$.

The classification system 10 also includes a testing mode 60 (FIG. 2) wherein known training text samples may be entered by a supervisor or operator via the supervisory UI 19. This mode is primarily used for testing the accuracy of the system 10, and enables the operator to determine if it is necessary to continue to train the system.

Although the foregoing description has focused on elevating textual user content, it will be appreciated that the classification system is not so narrowly restricted. Fore instance, it is possible to define an attribute $X_{20}$ which characterizes the type of music communicated by the user. There are known music recognition algorithms that can identify a song from a few notes thereof. Attribute $X_{20}$ can thus be an indication of a song(s) communicated by the user, which is looked up in a music database. It is believed that music may be an important criteria for distinguishing the user's age as, for example, children, teens and adults will typically listen to different types of music, or more particularly, to different artists.

Those skilled in the art will appreciate that a neural network approach is not the only method by which reference attributes can be generated for classification purposes. In alternate embodiments, large populations of known text samples may be collected and mean or medium values may be calculated to establish reference attributes for each class. Those skilled in the art will appreciate that other modifications may be made to the embodiments discussed herein without departing from the spirit or scope of the claims.

The invention claimed is:

1. A method of identifying undesirable communications over a computer network between a first user and a second user thereof, said method comprising:

providing plural sets of reference attributes, wherein each set of reference attributes is associated with one of a plurality of personal profile classes;

providing pre-defined rules defining impermissible communication between various personal profile classes;

analyzing text generated or provided by said first user in order to extract a set of attributes corresponding to said first user text and analyzing text generated or provided by said second user in order to extract a set of attributes corresponding to said second user text;

comparing said set of extracted attributes for said first user text against said plural sets of reference attributes in order to find a close match and comparing said set of extracted attributes for said second user text against said plural sets of reference attributes in order to find a close match;

associating said first user with the personal profile class of said first matched set of reference attributes and associating said second user with the personal profile class of said second matched set of reference attributes;

signaling an alert in the event the personal profile class of said first user and the personal profile class of said second user contravene said rules.

2. A method according to claim 1, wherein said attributes include one or more of the following:

(a) spelling errors;
(b) grammatical errors;
(c) verb usage;
(d) adjective usage;
(e) use of emoticons; and
(f) usage of words from one or more topical vocabularies.

3. A method according to claim 1, wherein said attributes include the proportion of words in said text that are found in word vocabularies associated with each said personal profile class.

4. A method according to claim 3, including building said word vocabularies for each class by aggregating words from a plurality of known text samples.

5. A method according to claim 1, including:
provisioning a neural network, wherein the nodes thereof respectively represent said personal profile classes;
provisioning a plurality of training texts;
analyzing said training texts in order to extract a set of attributes corresponding to each said text;
training said neural network to establish weights for each said node based on said training text attributes; and
after the completion of said training, establishing said nodal weights as said set of reference attributes for each said personal profile class.

6. A method according to claim 5, wherein said training includes a self-organized mapping of said training text attributes to said nodes.

7. A method of ascertaining an approximate age of an anonymous user communicating over a computer network, said method comprising:
providing plural sets of reference attributes, wherein each set of reference attributes is associated with one of a plurality of age classes, and wherein said reference attributes for text include at least one of spelling errors and grammatical errors;
analyzing text or audio generated or provided by said user to the network in order to extract a set of attributes corresponding to said text or audio;
comparing said set of extracted attributes against said plural sets of reference attributes in order to find a close match; and
associating said user with the age class of said matched set of reference attributes.

8. A method according to claim 7, wherein said attributes include one or more of the following:
(a) verb usage;
(b) adjective usage;
(c) use of emoticons; and
(d) usage of words from one or more topical vocabularies; and
(e) usage or references to music or musical artists.

9. A method according to claim 7, wherein said attributes include the proportion of words in said text that are found in word vocabularies associated with each said personal profile class.

10. A method according to claim 9, including building said word vocabularies for each class by aggregating words from a plurality of known text samples.

11. A method according to claim 7, including:
provisioning a neural network, wherein the nodes thereof respectively represent said personal profile classes;
provisioning a plurality of training texts;
analyzing said training texts in order to extract a set of attributes corresponding to each said text;
training said neural network to establish weights for each said node based on said training text attributes; and
after the completion of said training, establishing said nodal weights as said set of reference attributes for each said personal profile class.

12. A method according to claim 11, wherein said training includes a self-organized mapping of said training text attributes to said nodes.

* * * * *